United States Patent Office 3,327,646
Patented June 27, 1967

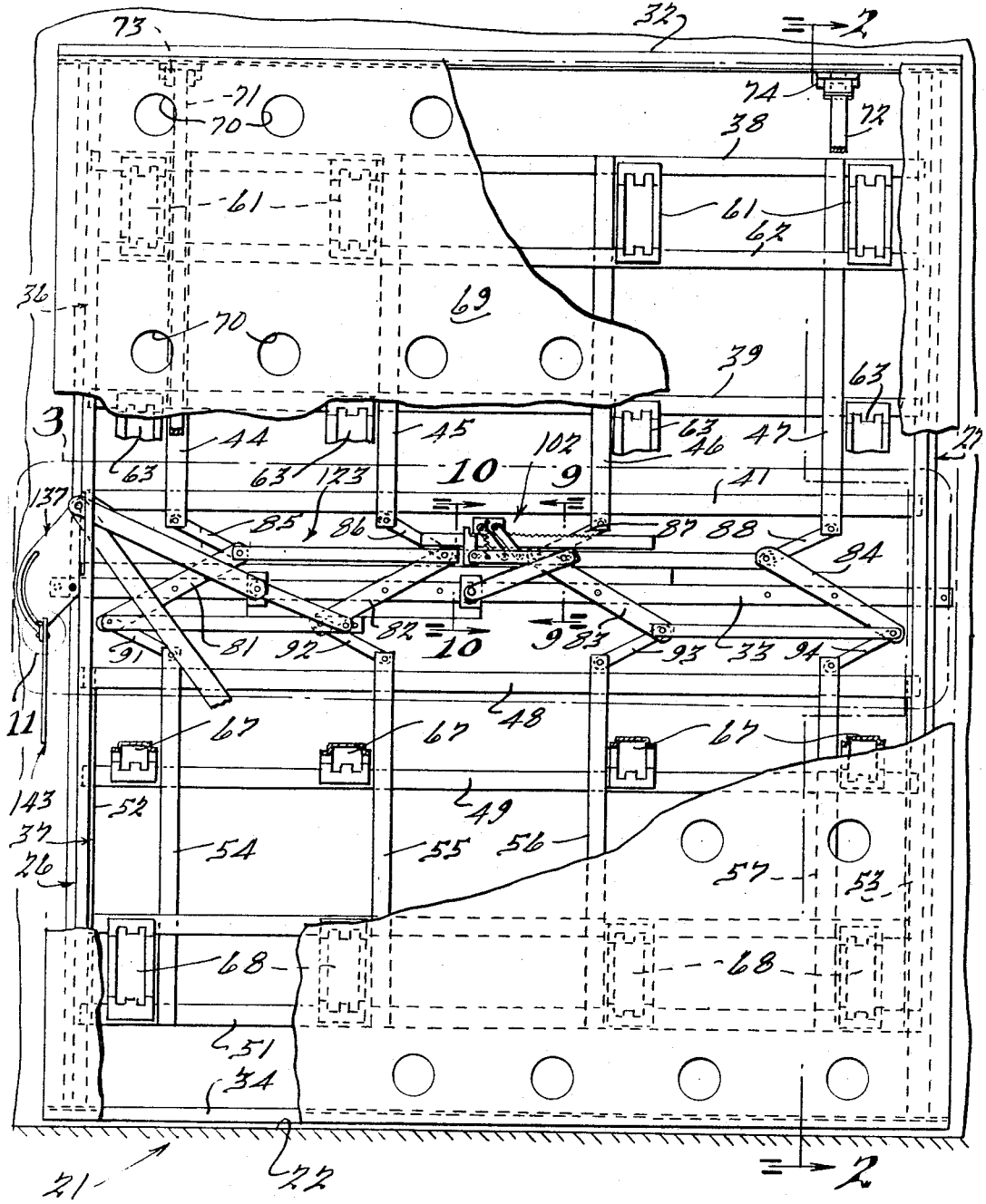

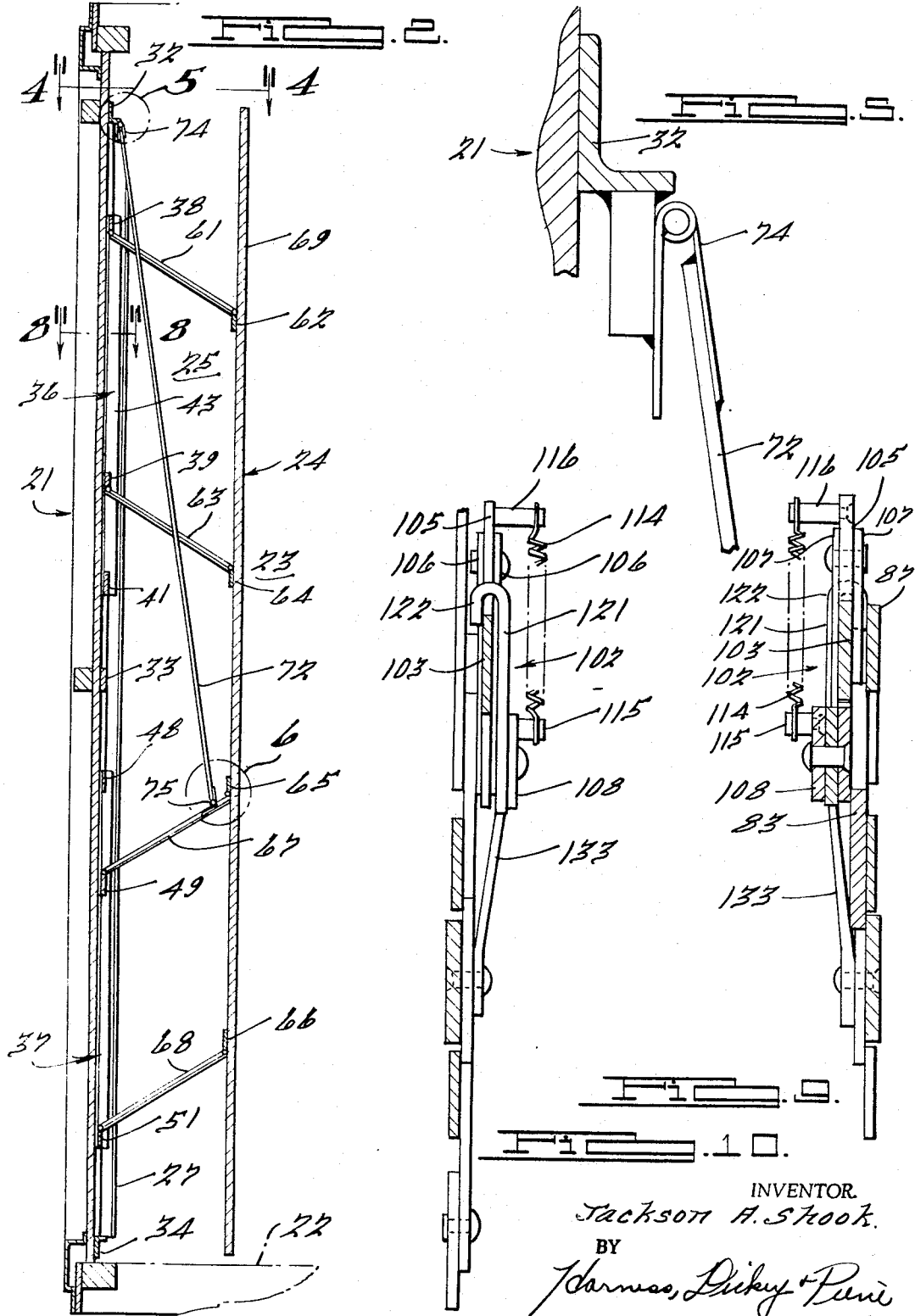

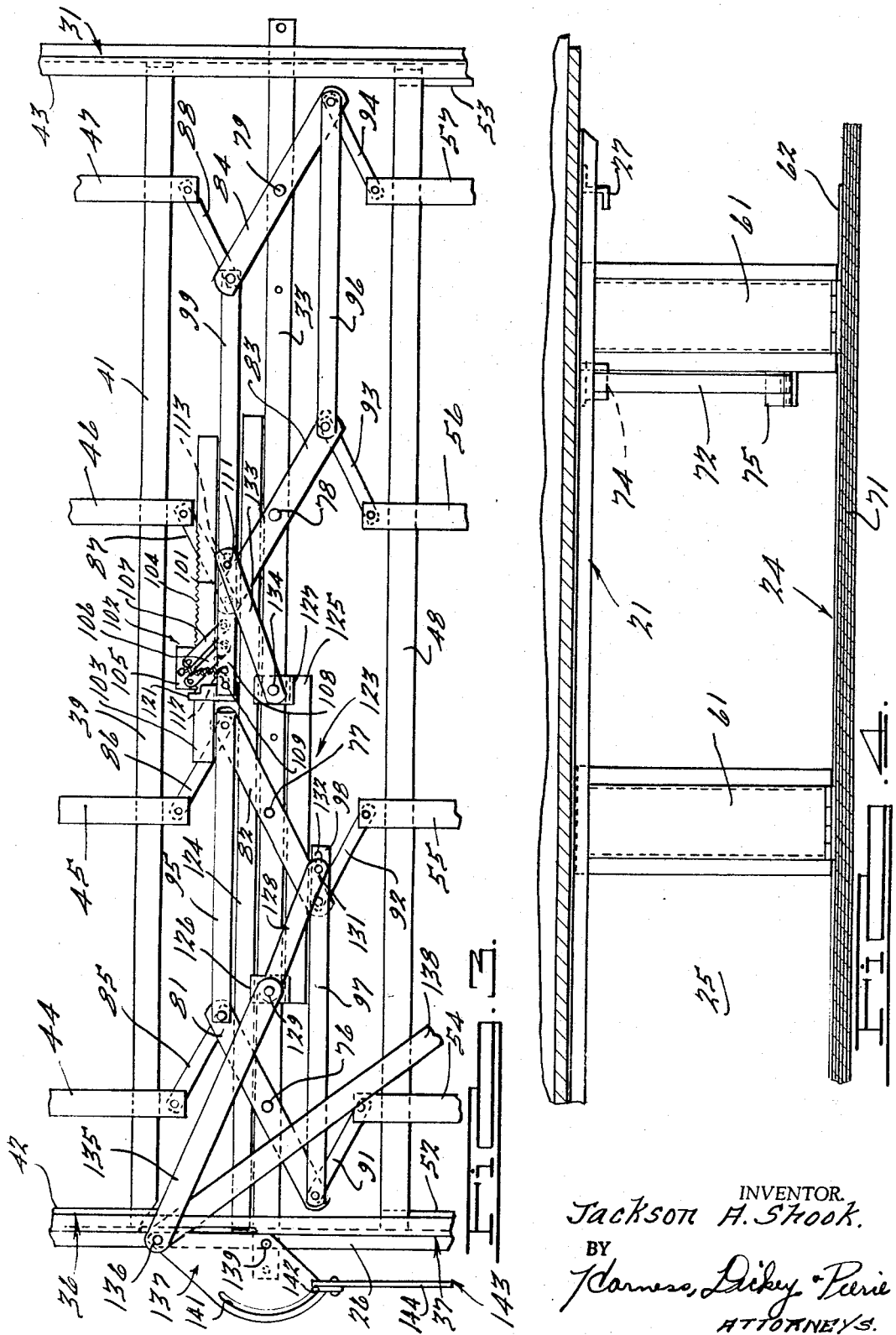

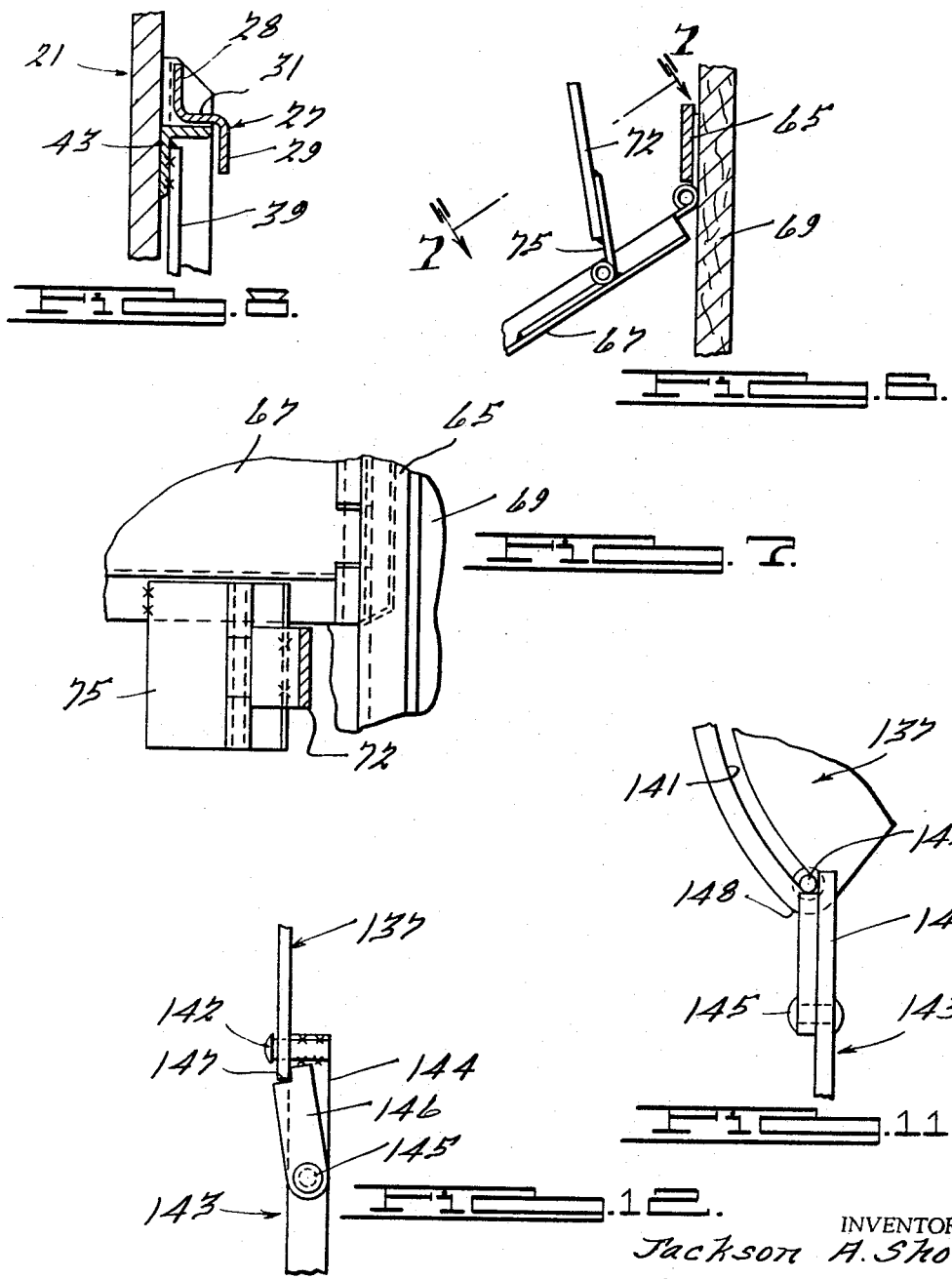

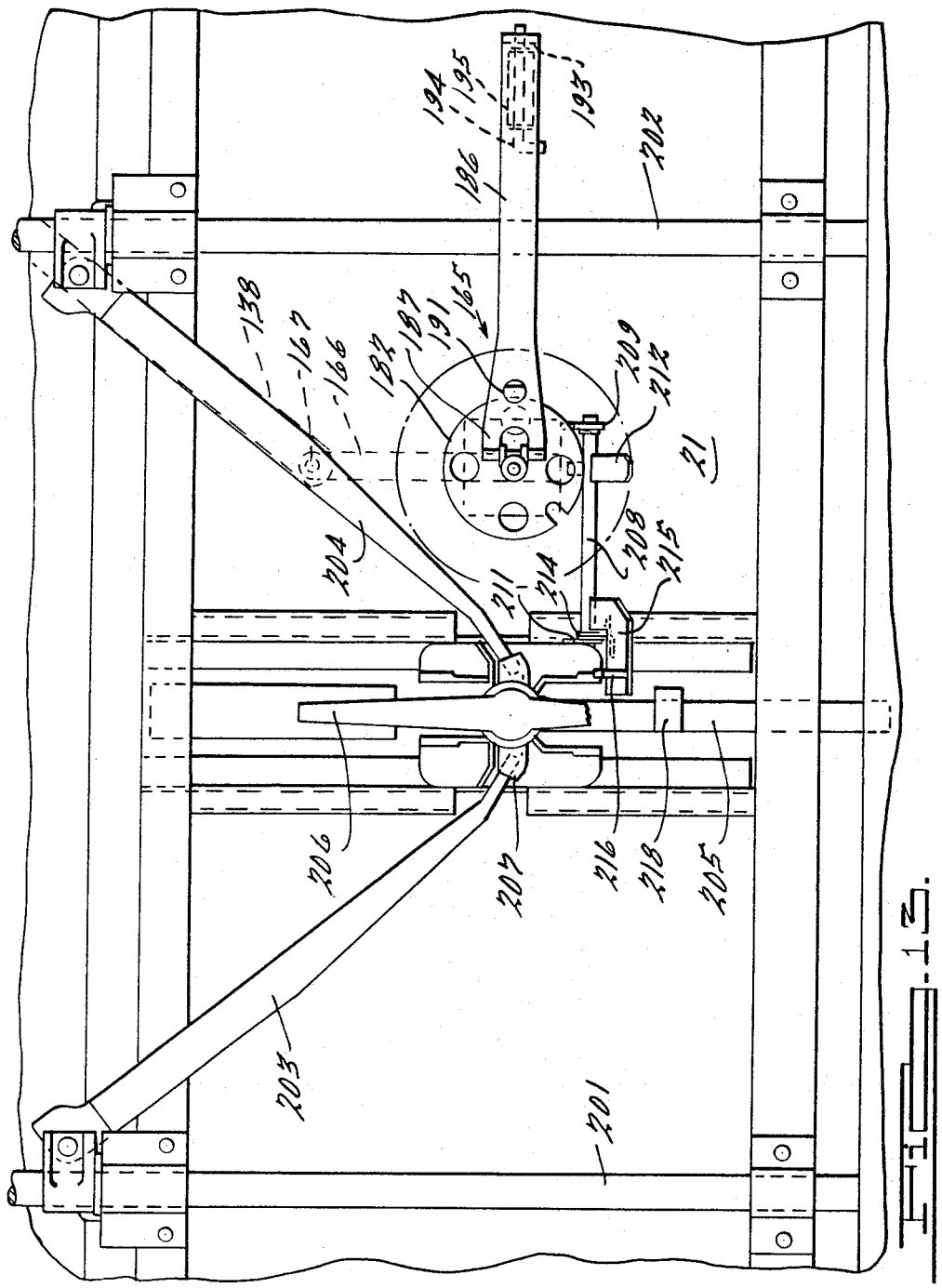

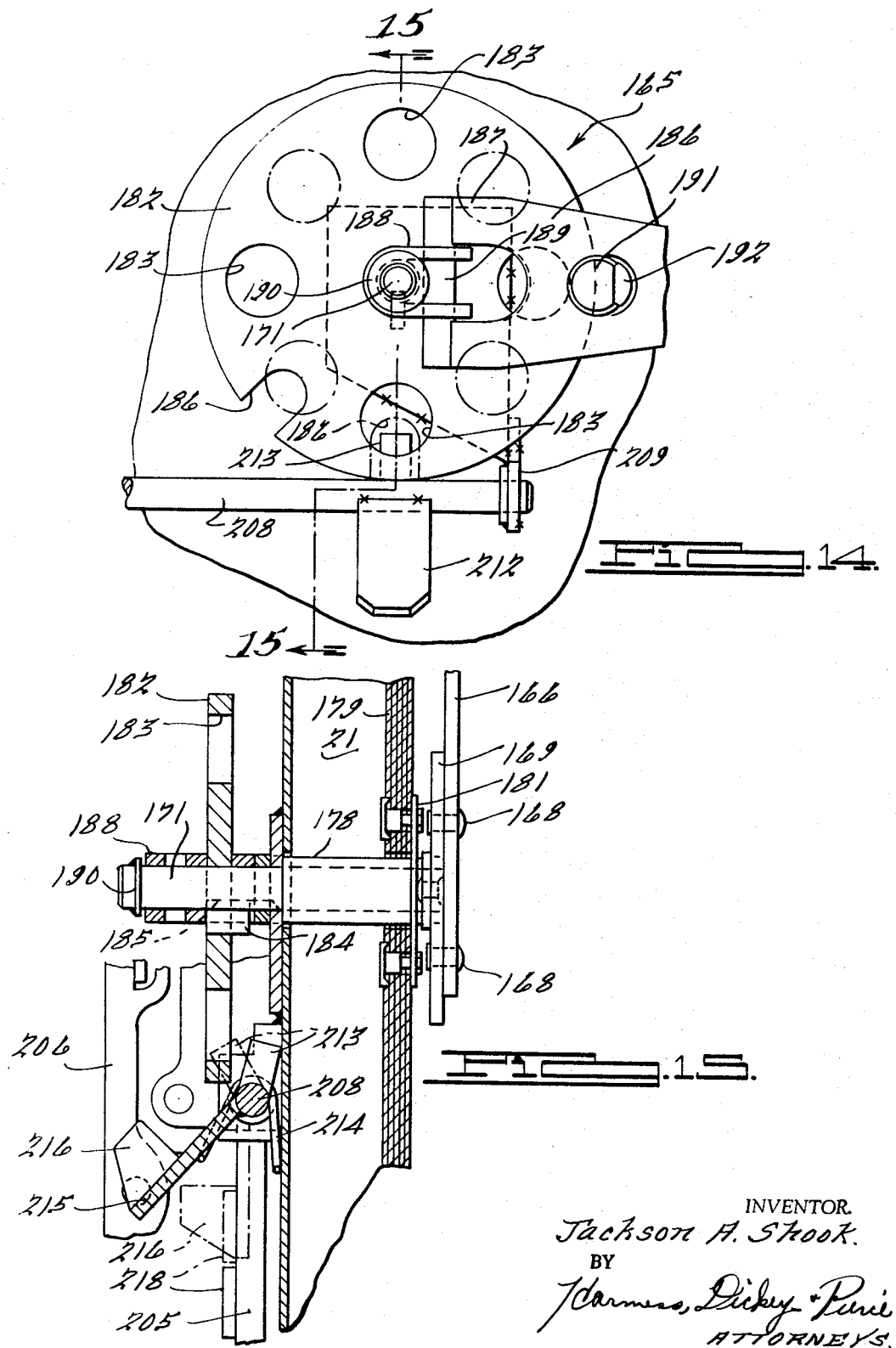

3,327,646
FREIGHT BRACING MEANS
Jackson A. Shook, Northville, Mich., assignor to Evans Products Company, a Corporation of Delaware
Filed Mar. 22, 1965, Ser. No. 441,522
15 Claims. (Cl. 105—369)

This invention relates to a freight bracing means for bracing freight within a storage area and more particularly to sidewall filler panel assembly for use in a railway car or the like.

Frequently, a plurality of similarly shaped items will be stored within a storage area. Quite often the articles are of such a size that they will not extend completely between opposing walls of the storage area. It is desirable to brace the freight within the storage area in this case to preclude movement of the freight. This is particularly important where the freight is stored within a railway car or other type of moving vehicle. It has been proposed to provide a freight bracing means that is supported directly by one of the walls of the storage area and may be extended or retracted with respect to its supporting wall to engage the freight. It is most desirable if the freight bracing means may be actuated from its operative to its storage position either from within or externally of the storage area.

Therefore, it is the principal object of this invention to provide a freight bracing means for bracing freight within a storage area that may be actuated from either within or externally of the storage area.

In the case of railway cars, it is most desirable to make use of the maximum storage area within the car. This involves placing freight adjacent the side access doors of the car. The freight bracing problems noted previously, are also present when freight is positioned adjacent the doors. It is thus necessary in these applications to provide a freight bracing means between the freight and the door. If the freight bracing means is supported by the door, it is essential that it be retracted before the door, which is normally of the sliding type, is opened.

It is, therefore, a further object of this invention to provide a freight bracing means supported by an access door and an interlock that precludes opening of the door until the freight bracing means is in its storage position.

It is also necessary to insure that the freight bracing means is not extended if the door is in a partially closed position. It is thus a further object of this invention to provide an interlock that precludes extension of the freight bracing means until the door is in its fully closed position.

Frequently, the freight bracing means takes the form of an elongated filler wall assembly. When such a filler wall assembly is provided, it is necessary to support it so that it may freely be moved between its storage and its operative positions. Also it is most desirable if some mechanism is provided so that the freight bracing means may be fixed in any of a plurality of positions between its fully extended and its storage positions.

It is a still further object of this invention to provide an improved filler wall assembly.

It is a further object of this invention to provide a locking mechanism for a filler wall assembly that permits it to be adjusted to a plurality of positions.

Other objects and advantages of this invention will become more apparent as this description proceeds, particularly when considered in conjunction with the accompanying drawings, wherein:

FIGURE 1 is an elevational view, with portions broken away and other portions shown in section, of a portion of a railway car embodying this invention;

FIGURE 2 is a cross sectional view taken along the line 2—2 of FIGURE 1;

FIGURE 3 is an enlarged view of the area encompassed by the circle 3 in FIGURE 1;

FIGURE 4 is a cross sectional view taken along the line 4—4 of FIGURE 2;

FIGURE 5 is an enlarged view of the area encompassed by the circle 5 in FIGURE 2;

FIGURE 6 is an enlarged view of the area encompassed by the circle 6 in FIGURE 2;

FIGURE 7 is a cross sectional view taken along the line 7—7 of FIGURE 6;

FIGURE 8 is an enlarged cross sectional view taken along the line 8—8 of FIGURE 2;

FIGURE 9 is an enlarged cross sectional view taken along the line 9—9 of FIGURE 1;

FIGURE 10 is an enlarged cross sectional view taken along the line 10—10 of FIGURE 1;

FIGURE 11 is an enlarged view of the area encompassed by the circle 11 in FIGURE 1;

FIGURE 12 is an end view of the area shown in FIGURE 11;

FIGURE 13 is an elevational view of the railway car shown in FIGURE 1 taken from the exterior;

FIGURE 14 is an enlarged view of the encircled area in FIGURE 13, and

FIGURE 15 is a cross sectional view taken along the line 15—15 of FIGURE 14.

Referring now in detail to the drawings, it is to be understood that although this invention is shown as embodied in a railway car, it may be used in conjunction with other types of freight storage devices. It has particular application, however, to the bracing of freight within vehicles wherein the freight may be subjected to damage if it is permitted to shake from side to side or end to end within the vehicle in which it is stored.

Referring first to FIGURES 1 and 2, a railway car embodying this invention is illustrated partially and comprises a sidewall having an access opening that is closed by a side door assembly, indicated generally by the reference numeral 21. The side door assembly 21 is supported in a known manner for sliding movement along the car side wall from a closed position across the access opening to an open position spaced from it. For example, the side door assembly 21 may be supported for this sliding movement in the manner shown in Cook et al. Patent 2,930,332, entitled "Railway Boxcars and Doors Therefor," issued Mar. 29, 1960. The sidewall and side door assembly 21 terminate at a floor 22 which defines in part with the sidewall and door asesmbly 21 a storage area, indicated generally by the reference numeral 23. A sidewall filler assembly indicated generally by the reference numeral 24, is supported by the side door assembly 21 for movement from a retracted or storage position, to an operative position, the latter of which is shown in the drawings. In its operative position, the sidewall filler assembly 24 is adapted to fill a void 25 which may exist at the side of the storage area 23 if the freight contained therein is of such a size that it is impossible to fill the storage area 23 along one dimension. The sidewall filler assembly 24 can be extended to engage the sides of the freight within the storage area to preclude lateral movement thereof.

Referring now additionally to FIGURES 3 through 7, the door assembly 21 may include a pair of Z-shaped structural elements 26 and 27 that are fixed at each side thereof. Alternatively, the elements 26 and 27 may not form part of the door assembly 21 itself, but may be affixed to suitable structural elements of the door assembly. As seen in more detail in FIGURE 8, the structural elements 26 and 27 each include a first leg 28 that is affixed to the door assembly 21 and a second leg 29 that extends parallel to the first leg 28 and is displaced outwardly from the door assembly 21 by a leg 31. The legs 29 of the members 26 and 27 face each other. A plurality of longitudinally extending structural members 32, 33 and 34 span the structural members 26 and 27 and are affixed, as by welding, thereto. In the illustrated embodiment, the members 32 and 34 are structural angles and the member 33 is a strap of steel stock.

Sidewall filler assembly

Supported between the structural members 26 and 27 are an upper sidewall actuating frame assembly 36 and a lower sidewall actuating frame assembly 37. The assembly 36 includes horizontally extending strap members, 38, 39 and 41. The opposite sides of the horizontally extending members 38, 39 and 41 are affixed to vertically extending structural angles 42 and 43 that are supported for vertical movement but restrained against horizontal movement by engagement with the legs 29 and 31 of the Z-shaped structural members 26 and 27 (FIGURE 8). Vertically extending straps 44, 45, 46 and 47 are affixed at spaced intervals to the horizontally extending members 38, 39 and 41. The lower ends of the straps 44 through 47 terminate below the lower edges of the horizontally extending member 41.

The lower sidewall actuating frame assembly 37 is substantially similar to the upper frame 36 but is inverted. The lower frame assembly 37 includes horizontally extending members 48, 49 and 51 that are joined at each side thereof to vertically extending structural angles 52 and 53 that are also guided for vertical movement but restrained against horizontal movement by the structural members 26 and 27 of the door assembly 21. Vertically extending straps 54, 55, 56 and 57 are fixed at spaced intervals along the length of the horizontal members 48, 49 and 51. The vertical straps 54 through 57 extend above the horizontal member 48.

A plurality of upper strap hinges 61 are pivotally connected at their upper ends to the horizontal member 38 of the upper sidewall actuating frame assembly 36 and at their lower ends to a horizontally extending structural member 62 of a filler wall panel supporting frame. Each of a row of strap hinges 63 are connected at their upper ends to the horizontal member 39 of the sidewall actuating frame 36 and at their other ends to a horizontally extending structural member 64 of the filler wall panel supporting frame. The lower sidewall actuating frame assembly 36 is pivotally connected, in a like manner, to horizontally extending structural members 65 and 66 of the filler wall supporting frame by upper strap hinges 67 and lower strap hinges 68. The strap hinges 67 and 68 extend upwardly from pivotal connections with the horizontal structural members 49 and 51, respectively, of the lower sidewall actuating frame assembly 37 to the structural members 65 and 66.

A filler wall panel in the form of a sheet of plywood or the like 69 is affixed in any suitable manner to the filler wall supporting frame members 62, 64, 65 and 66, preferably by bolting so that the panel 69 may be replaced if it is damaged. A plurality of circular apertures 70 are formed in the panel 69 to permit air to flow freely between opposite sides of the filler wall panel when it is being retracted and extended to facilitate its movement.

To assist in carrying the weight of the filler wall assembly 24, particularly when it is in the extended position, a pair of vertically extendnig strap members 71 and 72 are provided. The strap member 71 is pivotally connected, as by a hinge 73, adjacent its upper end to the structural angle 32 that is affixed to the door assembly 21. In a like manner, the strap member 72 is pivotally connected by a hinge assembly 74 to the structural angle 32 (FIGURE 5). The lower ends of the strap members 71 and 72 are pivotally connected, as by hinges 75 (only one of which is shown) to the hinges 67 (FIGURES 2, 6 and 7).

The actuating structure for vertically moving the sidewall actuating frames 36 and 37 and extending the filler wall panel 69 will now be described in detail by particular reference to FIGURES 1 and 3. The strap 33 of the door assembly 21 is provided with a plurality of apertures that receive pivot pins 76, 77, 78 and 79. Bellcranks 81, 82, 83 and 84 are pivotally supported upon the pivot pins 76, 77, 78 and 79, respectively. It will be noted that the bellcranks 81 and 82 extend at an opposite angle to the bellcranks 83 and 84. The purpose for this is to equalize the side loading upon the sidewall actuating frame assemblies 36 and 37 so that they will slide freely in the structural members 26 and 27 without binding. The upper ends of the bellcranks 81, 82, 83 and 84 and the lower ends of the vertically extending straps 44, 45, 46 and 47 of the upper sidewall actuating frame assembly 36 are pivotally connected to opposite ends of the links 85, 86, 87 and 88, respectively. In a like manner, the lower ends of the bellcranks 81, 82, 83 and 84 and the upper ends of the vertically extending straps 54, 55, 56 and 57 of the lower sidewall actuating frame assembly 37 are pivotally connected to opposite ends of the links 91, 92, 93 and 94, respectively.

The upper ends of the bellcranks 81 and 82 and lower ends of the links 85 and 86 are interconnected by a parallel link 95 that is pivotally connected at each of its ends to the respective bellcranks and links. In a like manner, the lower ends of the bellcranks 83 and 84 and upper ends of the links 93 and 94 are interconnected by a parallel link 96 that is pivotally connected at each of its ends to the respective bellcranks and links. The lower ends of the bellcranks 81 and 82 and the upper ends of the links 91 and 92 also are connected by a parallel link 97. The link 97, however, does not terminate at the pivotal connection between the bellcrank 81 and the link 92 but has a portion 98 thereof which extends past these links. In a similar manner, the upper ends of the bellcranks 83 and 84 and the lower ends of links 87 and 88 are connected by a parallel link 99 that has an extending portion 101.

The sidewall actuating frame assemblies 36 and 37 and the filler wall panel 69 are fixed in position by a latch assembly, indicated generally by the reference numeral 102 and shown in more detail in FIGURES 9 and 10 in addition to FIGURES 1 and 3. The latch assembly 102 comprises a latch bar 103 that is affixed at one of its ends, as by welding, to the parallel link 95. The latch bar 103 has a plurality of serrations or teeth 104 formed on its upper edge. Cooperating with the teeth 104 serrated teeth formed on the lower surface of a locking block 105. The locking block 105 is pivotally connected at each side thereof to a pair of links 106 and 107. The lower end of the links 106 and 107 are pivotally connected to a horizontally extending release bar 108 that has a pair of pins 109 and 111 affixed at each end thereof. The pins 109 and 111 extend into an elongated aperture 112 formed in the extending end 101 of the parallel link 99 and into an elongated aperture 113 in the parallel link 99. The pins 109 and 111 and elongated apertures 112 and 113, therefore, form a lost motion connection between the release bar 108 and the parallel link 99. A coil spring 114 is connected between a pin 115 that is affixed to the release bar 108 and a pin 116 that is affixed to the locking block 105 to urge the serrated teeth of the block 105 into engagement with the serrated teeth 104 of the locking bar 103. Affixed to the outer end of the release bar 108 is a release dog 121 that has an arcuate end 122 that encircles the locking bar 103.

An actuating mechanism, indicated generally by the reference numeral 123 and best shown in FIGURES 1 and 3, is provided to release the latch assembly 102 and extend and retract the sidewall filler assembly 24. The actuating mechanism 123 includes a pair of horizontally extending bars 124 and 125 that are positioned above and below and slide upon the horizontal strap 33 of the door assembly 21. A pair of vertically extending strap members 126 and 127 are affixed to each end of the lower bar 125, which is shorter than the upper bar 124, and to the upper bars 124. The straps 126 and 127 are positioned on opposite sides of the horizontally extending strap 33 so that the bars 124 and 125 will be constrained in a lateral direction with respect to the strap 33, but will be free to slide along it.

An actuating link 128 is pivotally connected at one end, as by a pivot pin 129 to the strap 126. The lower end of the actuating link 128 has a pin 131 affixed thereto that extends into an elongated slot 132 formed in the extending end portion 98 of the parallel link 97. An actuating link 133 is pivotally connected at its lower end, by a pivot pin 134, to the strap 127. The upper end of the actuating link 133 is pivoted to the pin 111 of the release bar 108.

An operating link 135 is pivotally connected adjacent its lower end to the pivot pin 129. The upper end of the operating link 135 is pivotally connected to a pivot pin 136 that is affixed to a bellcrank assembly 137. The bellcrank assembly 137 forms a portion of the inside operating mechanism for the sidewall filler assembly 24. An upper end of an operating link 138 is also pivotally connected to the pivot pin 136. The operating link 138 forms a portion of the outside operating mechanism for the sidewall filler assembly 24.

*Operation of sidewall filler assembly*

Prior to the description of the individual internal and external operating mechanisms of the sidewall filler assembly, it is believed that a description of the operation of the sidewall filler mechanism which has already been described will be helpful. The filler wall panel 69 is illustrated in its fully extended position in the drawings. If it is desired to retract the panel 69, the bellcrank assembly 137 is rotated in a clockwise direction about a pivot pin 139 that pivotally supports it upon the structural member 26 of the door assembly 21. This pivotal movement may be caused either internally of the storage area 25 or externally of it, as will become more apparent as this description proceeds.

When the bellcrank assembly 137 is rotated in a clockwise direction, the operating link 135 exerts a force through the pivot pin 129 that tends to cause it to move to the right, as viewed in FIGURES 1 and 3. When the pivot pin 129 is moved to the right, the bars 124 and 125 which are affixed to the strap 126 also slide to the right along the strap 33. The movement of the pivot pin 129 is also transmitted through the actuating link 128 to the pivot pin 131. The actuating link 133 also is moved because of its connection to the pivot pin 134. The initial movement of the links 128 and 133 to the right causes the pins 131 and 111 to traverse the apertures 132 and 113 so that the parallel links 97 and 99 will not be actuated.

The pin 101, however, is affixed to the latch release bar 108 so that it will move upon the initial movement of the operating lever 135. During this initial movement, the release dog 121 engages the locking block 105 and causes the links 106 and 107 to pivot tensioning the coil spring 114. When this occurs, the serrations of the locking block 105 will be moved free of the teeth 104 so that the panel 69 and panel actuating frames 36 and 37 will be released for movement.

Continued movement of the bellcrank 137 and corresponding movement of the operating link 135 causes the pins 131 and 111 to complete their traverse of the apertures 132 and 113. The pin 109 also traverses the aperture 112 during this movement. After the apertures are completely traversed, the respective pins will engage the parallel links 97 and 109 and cause them to move to the right. The link 97 then causes the bellcranks 81 and 82 to rotate in a counterclockwise direction and the link 99 rotates the bellcranks 83 and 84 in a clockwise direction. The rotation of the bellcranks 81, 82, 83 and 84 is transmitted through links 85, 86, 87, 88, 91, 92, 93 and 94 to the sidewall actuating frames 36 and 37. The frame 36 is forced upwardly and the frame 37 downwardly. When the frame 36 moves upwardly, the pivotal connections of the hinges 61 and 63 to the straps 38 and 39 also move upwardly to cause the upper end of the panel 69 and its supporting frame to be drawn inwardly. In a like manner, the downward movement of the lower sidewall actuating frame 37 causes the lower end of the hinges 67 and 68 to move downwardly and draw the lower surface of the filler wall panel 69 and its supporting frame inwardly toward the door assembly 21.

The filler wall panel 69 may be fully retracted or may be held in any desired position. When the required position of the filler wall panel 69 is reached, the rotation of the bellcrank assembly 137 is ceased. This will remove the tension of the release dog 121 upon the locking block 105 and it will again engage the serrations 104 of the locking bar 103. It will be seen, therefore, that the various serrations 104 function as a means to lock the filler wall panel 69 in any position with respect to the door assembly 21.

When it is desired to extend the filler wall panel 69, the bellcrank assembly 137 is rotated in a counterclockwise direction. The upper and lower sidewall actuating frames 36 and 37 will then move in a direction opposite to that previously described to again extend the filler wall panel 69. The motion of the actuating mechanism is also opposite to that previously described. The latch mechanism 102 is not released by the release dog 121 during extension of the filler wall panel 69, however. It should be apparent that the angular disposition of the links 105 and 106 and the provision of the coil spring 114 permits the locking bar 103 to move to the right or ratchet with respect to the locking block 105 because of the incline of the serrations 104. There is no need, therefore, to release the latch assembly 102 during extension of the panel for this reason.

*Inside operating mechanism*

The inside operating mechanism for the filler assembly 24 will now be described with particular reference to FIGURES 1, 3, 11 and 12. As has been noted, the bellcrank assembly 137 is pivotally supported by a pivot pin 139 on the horizontal strap 33 of the door assembly 21. The bellcrank assembly 137 has an arcuate slot 141 in which is received a rivet 142 that forms a portion of an inside operating handle assembly 143. The operating handle assembly 143 includes an elongated operating handle 144 that is affixed, as by welding, to the rivet 142. The enlarged head of the rivet 142 retains it within the slot 141. Adjacent to the rivet 142 and transversely to it, a rivet 145 extends through the upper end of the handle 144. A locking pawl 146 having a recessed end 147 is pivotally supported upon the rivet 145. The recessed end 147 engages an arcuate portion 148 formed at the lower end of the bellcrank assembly 137 adjacent the lower end of the slot 141.

Referring to FIGURE 11, if the handle 144 is grasped at its lower end and rotated upwardly in a counterclockwise direction about the pin 142, the locking pawl portion 147 will bite into the bellcrank assembly 137 and permit it to be rotated. The handle assembly 143 is normally stored in a vertically extending position by means of a latch (not shown) that affixes it with respect to the door. If it is necessary to move the handle 143 with respect to the bellcrank 137 to return it to its storage position, the locking pawl 146 may be released by moving the recessed portion 147 clear of the bellcrank assembly 137.

*Outside operation mechanism*

The outside operating mechanism assembly for the filler wall panel 69 and the interlock that prevents opening or closing of the door assembly 21, unless the filler wall panel 69 is in its retracted position and that precludes extension of the filler wall panel 69 when the door assembly 21 is opened, will now be described with particular reference to FIGURES 13 through 15. An outside operating handle assembly is indicated generally by the reference numeral 165 and includes a link 166 that is pivotally connected at its upper end, as by a pivot pin 167, to the lower end of the operating link 138. The lower end of the link 166 is rigidly connected, as by rivets 168, to a plate 169. The plate 169 is affixed to the inner end of a shaft 171 that extends through the door assembly 21. The shaft 171 is journaled within the door assembly 21 by a bushing 178 that is affixed to a plywood inner surface 179 of the door assembly 21 by a plate assembly 181 that is affixed to the inner end of the bushing 178.

An operating wheel 182 having a plurality of equally spaced circular apertures 183 positioned therein is affixed against rotation with respect to the outer end of the shaft 171 by a key 184 that extends into a keyway 185 formed in the shaft 171. The wheel 182 has a generally circular external configuration that is interrupted by a notch 186. An operating handle 186 has a bifurcated end 187 that is pivotally supported upon a clamp 188 by a pin 189. The clamp 188 is fixed axially with respect to the shaft 171 by a washer 190 that is welded to the outer end of the shaft 171. The clamp 188 is free to rotate with respect to the shaft 171, however. A generally cylindrical pin 191 is affixed to the operating handle 186 adjacent the wheel 182. The pin 191 has a relieved portion 192, the purpose of which will become more apparent as this description proceeds. The outer end of the operating handle 186 has an inturned end 193 that is contacted by a locking pin 194 of a latch assembly 195 to hold the handle 186 in its inoperative position.

When it is desired to operate the filler wall assembly 24 by means of the external operating handle 186, the latch 195 is released. The operating handle 186 is then rotated in a plane normal to the outer surface of the door assembly 21 so that the pin 191 will face the wheel 182. The pin 191 is swung into one of the apertures 183, the relieved portion 192 facilitating this registry. When the pin 191 is engaged within one of the apertures 183 the operating handle 186 is turned to rotate the wheel 182. Motion is then transmitted through the shaft 171 to the link 168 and operating link 138 to retract or extend the filler wall assembly 24.

Since the filler wall assembly 24 is supported by the door assembly 21 on its inner or storage area side, it is essential that the filler wall assembly 24 be retracted to its storage position before the door assembly 21 is opened. In its fully extended position, the filler wall assembly 24 would interfer with movement of the door assembly 21 into its opened position. In a like manner, the filler wall assembly 24 should not be extended when the door assembly 21 is in its open position. The interlock mechanism now to be described provides the safety features.

The door assembly 21 has a pair of locking members 201 and 202 for locking the door assembly 21 in its closed position. A pair of operating handles 203 and 204 are connected to the locking members 201, 202 in a known manner for releasing them and for opening the door assembly 21. A vertical locking strap 205 also is provided to lock the door assembly 21 in its closed position. A main door operating handle 206 is supported upon the door for rotation with respect thereto. The main door operating handle 206 coacts with a channel shaped member 207 which normally restrains the lower end of the operating handles 203 and 204 in inoperative position wherein the locking members 201 and 202 cannot be released. The operating handle 206 also raises and lowers the locking strap 205.

Although the operating handle 206 and its connection with the handles 203 and 204 and the locking strap 205 is well known, its operation, in general, will be described. When it is desired to open the door assembly 21, the handle assembly 206 is rotated in a counterclockwise direction as viewed in FIGURE 13. Rotation of the handle 206 raises the locking strap 205 and causes the channel shaped member 207 to move axially outwardly from the door assembly 21. Raising of the locking strap 205 releases it and outward movement of the channel member 207 releases the lower ends of the handles 203 and 204 so that the locking members 201 and 202 may be released.

A torsion shaft 208 is supported at its outer end in a bracket 209 that is welded to the door assembly 21 adjacent to the wheel 182. The opposite end of the torsion shaft 208 is supported in a bracket 211 that is affixed to the door assembly 21 adjacent to the main operating handle 206. The torsion shaft 208 has a release handle 212 welded to it adjacent to the wheel 182. Above the release handle 212, a locking dog 213 is affixed to the torsion shaft 208. The locking dog 213 is adapted to register with the notch 186 in the wheel 182 when the filler wall assembly 24 is in its retracted or storage position and only then. A coiled torsional spring 214 encircles the torsional shaft 208 and normally urges it in a clockwise direction as viewed in FIGURE 15 so that the locking dog 213 will be rotated away from the wheel 182. A plate 215 having an outwardly extending arm 216 is affixed adjacent the torsion spring 214.

When the torsion shaft 208 is rotated in a clockwise direction by the torsion spring 214, the plate 215 and its arm 216 will engage or be positioned adjacent to the operating handle 206 to prevent its rotation. Therefore, it may be seen that the plate 215 will normally preclude rotation of the handle 206 to unlock the door assembly 21. If, however, the sidewall filler assembly 24 is in its storage position, the notch 186 will register with the locking dog 213 and the torsion shaft 208 may be rotated in a counterclockwise direction against the bias of the torsion spring 214 by pushing downwardly upon the release handle 212. This will cause the plate 215 and its arm 216 to move free of the operating handle 206 so that it may be rotated and the door assembly 21 opened.

A blocking plate 218 is affixed to the strap 205 adjacent the plate 215. When the handle 206 is rotated and the locking strap 205 is released, the plate 218 will move in front of the plate 215. Therefore, the locking dog 213 will be restrained within the notch 186 of the wheel 182. It then will be impossible to move the filler wall assembly 24 from its storage position to its operative position by means of either the internal operating handle assembly 143 or the external operating handle assembly 165 until the door assembly 21 is again closed and locked.

It should be readily apparent that a relatively simple structure has been provided bracing freight within a storage area and the freight bracing means may be operated from either within or externally of the storage area. In the illustrated embodiment, the freight bracing means, which is in the form of a sidewall filler panel assembly, is supported upon an access door of the storage area. It should be readily apparent, however, that the filler panel assembly could be supported directly upon one of the walls that defines the storage area. In a like manner, the panels of the type disclosed could be positioned on all sides as well as the top and bottom walls of the storage area. In the disclosed embodiment wherein the filler wall panel assembly is supported on the door, it is essential that the door is not opened when the panel is retracted and conversely that the panel is retracted before the door is opened. A relatively simple interlock has been provided that is operative with respect to both the inside and outside operating mechanisms to insure that the door will not be opened when the panel is extended.

It is to be understood that the invention is not limited to the exact construction shown and described or to various modifications referred to in the foregoing description. Various other changes and modifications may be made without departing from the spirit and scope of the invention, as defined by the appended claims.

What is claimed is:

1. A freight bracing system for a railway car or the like defining a freight storage area comprising freight bracing means supported for movement from a retracted position to an extended position for engaging freight within the storage area, actuating means for moving said freight bracing means between its retracted and its operative positions, operating means for operating said actuating means, a ratchet mechanism interconnected with said actuating means for precluding movement of said freight bracing means from one of said positions to the other of said positions and for permitting movement of said freight bracing means from said other position to said one position, and means interconnected with said operating means for releasing said ratchet means prior to the movement of said freight bracing means from said one position to said other position by said operating means.

2. A freight bracing system for a railway car or the like defining a freight storage area comprising freight bracing means supported for movement from a retracted position to an operative position for engaging freight within the storage area, actuating means for moving said freight bracing means between its retracted and its operative positions, first operating means for operating said actuating means, said first operating means being located within the storage area, second operating means for operating said actuating means, said second operating means being positioned externally of the storage area, ratchet locking means cooperating with said actuating means for retaining said freight bracing means in any of a plurality of positions between said retracted position and said operative position, said ratchet locking means including locking elements for precluding movement of said freight bracing means from one of its positions to the other of its positions and for movement from said other position to said one position, and release means interconnected with each of said operating means for releasing said ratchet locking means upon actuation of either of said operating means and prior to movement of said actuating means to move said freight bracing means from said one position to said other position.

3. A freight bracing system for a railway car or the like defining a freight storage area and having an access door supported for movement between a closed position and an opened position for access to said storage area comprising freight bracing means supported for movement from a retracted position to an operative position for engaging freight within the storage area, said freight bracing means being disposed when in its operative position to interfere with movement of the access door between its closed and opened positions, actuating means for moving said freight bracing means between its retracted and its operative positions, means for operating said actuating means, ratchet locking means cooperating with said actuating means for locking said freight bracing means in any of a plurality of positions between its operative and its retracted positions, said ratchet locking means including locking elements for precluding movement of said freight bracing means from one of said positions to the other of said positions and for movement of said freight bracing means from said other position to said one position, release means interconnected with said operating means for releasing said locking elements upon operating of said operating means and prior to movement of said actuating means to move said freight bracing means from said one position to said other position, and means interconnected with said actuating means for precluding opening of said door when said freight bracing means is not in its retracted position.

4. A freight bracing system for a railway car or the like defining a freight storage area and having an access door supported for movement between a closed position and an opened position for access to said storage area comprising freight bracing means supported for movement from a retracted position to an operative position for engaging freight within the storage area, said freight bracing means being disposed when in its operative position to interfere with movement of the access door between its closed and opened positions, actuating means for moving said freight bracing means between its retracted and its operative positions, first operating means for operating said actuating means, said first operating means being located within the storage area, second operating means for operating said actuating means, said second operating means being positioned externally of the storage area, ratchet locking means cooperating with said actuating means for locking said freight bracing means in any of a plurality of positions between its operative and its retracted positions, said ratchet locking means including locking elements for precluding movement of said freight bracing means from one of said positions to the other of said positions and for movement of said freight bracing means from said other position to said one position, release means interconnected with each of said operating means for releasing said locking elements upon operation of either of said operating means and prior to movement of said actuating means to move said freight bracing means from said one position to said other position, and means interconnected with said actuating means for precluding opening of the door when said freight bracing means is not in its retracted position.

5. In combination, a device having a plurality of walls defining a storage area, a freight bracing panel positioned adjacent one of said walls and extending in a substantially parallel direction with respect to said one wall, a pair of panel actuating frames supported for sliding movement in directions parallel to said wall and said panel by said wall, linkage means interconnecting said panel actuating frames for simultaneous movement in opposite directions, hinge means pivotally connecting said panel actuating frames with said panel for moving said panel from a storage position adjacent said one wall to an operative position spaced from said one wall upon sliding movement of said panel actuating frames, locking means interconnected with said linkage means for affixing said freight bracing panel in a plurality of selected freight bracing positions, and release means for releasing said locking means, said freight bracing panel being movable between selected of said freight bracing positions when said release means are operated to release said locking means.

6. In combination, a device having a plurality of walls defining a storage area, a freight bracing panel positioned adjacent one of said walls and extending in a substantially parallel direction with respect to said one wall, a pair of panel actuating frames supported for sliding movement in directions parallel to said wall and said panel by said wall, hinge means pivotally connecting said panel actuating frames with said panel for moving said panel from a storage position adjacent said wall to an operative position spaced from said wall upon sliding movement of said panel actuating frames, means for sliding said panel actuating frames to move said panel, first operating means for said actuating means positioned upon the side of said wall adjacent said storage area, and second operating means for said actuating means positioned upon the side of said wall remote from said storage area.

7. In combination, a device having a plurality of walls defining a storage area, an access opening in one of said walls, an access door supported for movement from an open position to a closed position in registry with said access opening, a freight bracing panel positioned adjacent said door and extending in a substantially parallel direction with respect to said door, a pair of panel actuating frames supported for sliding movement in directions parallel to said door and said panel by said door, hinge means pivotally connecting said panel actuating frames with said panel for moving said panel from a storage position adjacent said door to an operative position spaced from said door upon sliding movement of said panel actuating frames, actuating means for operating said panel actuating frames, and means interconnected with said actuating means for precluding opening of said door when said panel is in its operative position.

8. The combination as set forth in claim 7 wherein first and second operating means are interconnected with the actuating means for operating the panel actuating frames, said first actuating means being positioned on the storage area side of said door, said second operating means being positioned on the side of said door externally of said storage area.

9. The combination as set forth in claim 7 wherein a locking means is interconnected with the panel actuating frames for locking said panel actuating frames and the panel in a plurality of positions between the operative and the storage positions.

10. In combination, a device having a plurality of walls defining a storage area, a freight bracing panel positioned adjacent one of said walls and extending in a substantially parallel direction with respect to said one wall, a pair of panel actuating frames supported for sliding movement in directions parallel to said wall and said panel by said wall, hinge means pivotally connecting said panel actuating frames with said panel for moving said panel from a storage position adjacent said one wall to an operative position spaced from said one wall upon sliding movement of said panel actuating frames, a pair of parallelogram linkage systems interconnected to said panel actuating frames for sliding said panel actuating frames, each of said parallelogram linkage systems being movable in opposite directions during simultaneous movement of said panel actuating frames, ratchet locking means interconnecting said parallelogram linkage systems for precluding movement of said parallelogram linkage systems in one direction and for movement thereof in another direction, and release means for releasing said ratchet locking means.

11. A freight bracing system for a railway car or the like defining a freight storage area comprising freight bracing means supported for movement from a retracted position to an operative position for engaging freight within the storage area, actuating means for moving said freight bracing means between its retracted and its operative positions, operating means for operating said actuating means, ratchet locking means cooperating with said actuating means for retaining said freight bracing means in any of a plurality of positions between said retracted position and said operative position, said ratchet locking means including locking elements for precluding movement of said freight bracing means from one of its positions to the other of its positions and for movement from said other position to said one position, release means for releasing said ratchet locking means, means including a lost motion connection interconnecting said operating means with said actuating means and interconnecting said actuating means directly to said release means for releasing said ratchet locking means upon actuation of said operating means to move said freight bracing means from said one position to said other position.

12. In combination, a device having a plurality of walls defining a storage area, an access opening in one of said walls, an access door supported for movement from an open position to a closed position in registry with said access opening, a freight bracing panel positioned adjacent said door and extending in a substantially parallel direction with respect to said door, a pair of panel actuating frames supported for sliding movement in directions parallel to said door and said panel by said door, hinge means pivotally connecting said panel actuating frames with said panel for moving said panel from a storage position adjacent said door to an operative position spaced from said door upon sliding movement of said panel actuating frames, a pair of parallelogram linkage systems interconnected to said panel actuating frames for sliding said panel actuating frames, each of said parallelogram linkage systems being movable in opposite directions during simultaneous movement of said panel actuating frames, ratchet locking means interconnecting said parallelogram linkage systems for precluding movement of said parallelogram linkage systems in one direction and for movement thereof in another direction, and release means for releasing said ratchet locking means, said freight bracing panel being movable between preselected freight bracing positions upon release of said ratchet locking means by said release means.

13. The combination set forth in claim 12 wherein an operating means is provided for operating the parallelogram linkage systems, said operating means being interconnected to the release means for releasing the ratchet locking means upon actuation of the operating means.

14. The combination as set forth in claim 13 wherein a lost motion connection is provided between the operating means and the parallelogram linkage systems whereby the release means is released prior to operation of said parallelogram linkage systems.

15. In combination, a device having a plurality of walls defining a storage area, an access opening in one of said walls, an access door supported for movement from an opened to a closed position in registry with said access opening, freight bracing means supported by said door for movement from a retracted position to an operative position for engaging freight within said storage area, actuating means for moving said freight bracing means between its retracted and its operative positions, an inside operating handle operatively connected to said actuating means for actuating said freight bracing means and supported within said storage area, an outside operating handle interconnected to said actuating means for actuating said freight bracing means and supported outside of said storage area upon said access door, said actuating means including a wheel and supported by said door having a cutout portion, said wheel being rotatable in response to movement of said freight bracing means, a locking dog supported for movement adjacent said wheel and adapted to register with said cutout portion for precluding rotation of said wheel, means biasing said locking dog out of engagement with said cutout portion, handle means for moving said locking dog into said cutout portion in opposition to said biasing means, means interconnecting said locking dog to said access door for precluding movement of said access door from its closed to its opened position when said locking dog is not in registry with said cutout portion, and means for retaining said locking dog in said cutout portion when said access door is not in its closed position.

References Cited

UNITED STATES PATENTS

| | | | |
|---|---|---|---|
| 1,833,016 | 11/1931 | Chandler | 105—369 |
| 2,056,815 | 10/1936 | Wynn | 105—369 |
| 2,819,810 | 1/1958 | De Witt | 105—369 |
| 2,885,221 | 5/1959 | Weeks | 105—369 |
| 2,958,873 | 11/1960 | Ferneau | 105—369 |
| 3,022,037 | 2/1962 | Stallard | 105—369 |
| 3,151,572 | 10/1964 | Moorhead et al. | 105—369 |
| 3,212,458 | 10/1965 | Roberston | 105—369 |

ARTHUR L. LA POINT, *Primary Examiner.*

DRAYTON E. HOFFMAN, *Examiner.*